Figure 1:
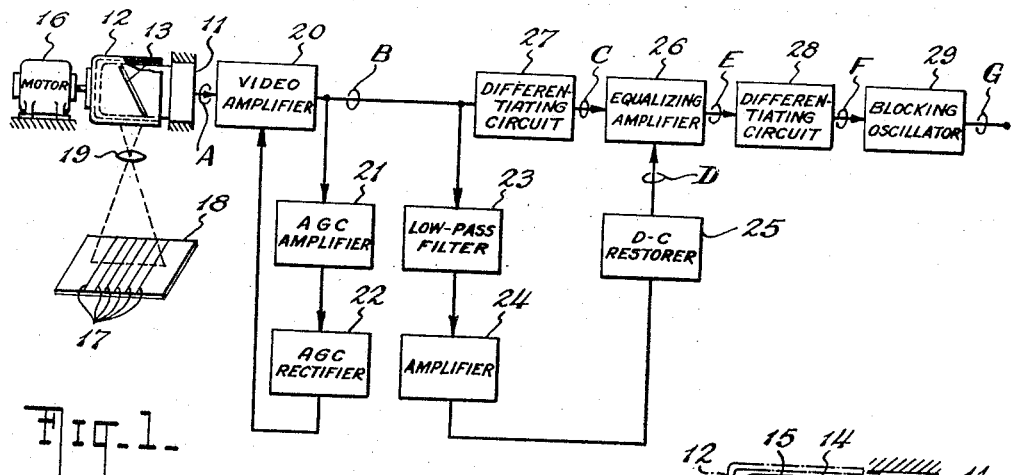

Jan. 27, 1959     R. B. WILLIAMS, JR     2,871,369
PULSE AMPLITUDE EQUALIZING SYSTEM
Filed Dec. 6, 1954

INVENTOR
ROGER B. WILLIAMS, JR.
BY
R. A. Spencer
AGENT

United States Patent Office 2,871,369
Patented Jan. 27, 1959

2,871,369

PULSE AMPLITUDE EQUALIZING SYSTEM

Roger B. Williams, Jr., Toledo, Ohio, assignor to Sperry Rand Corporation, a corporation of Delaware Application December 6, 1954, Serial No. 473,249

10 Claims. (Cl. 250—214)

The present invention relates to amplitude equalizing systems, and in particular to a system for equalizing the amplitudes of a series of pulses obtained from a photoelectric scanner.

A phototube scanner system may be devised to transversely scan a plurality of uniformly illuminated lines on a chart in which the moving image of the lines being scanned is projected upon and extends over the surface of the photosensitive cathode of a phototube. Such a system will produce a plurality of output pulses corresponding to the lines being scanned as well as an output voltage varying in magnitude according to the changes in sensitivity of the phototube during the scanning interval. The amplitudes of each of the output pulses from the phototube will also vary in amplitude according to the changes in sensitivity of the phototube. The sensitivity of a phototube to a light beam varies over its surface, usually being most sensitive near the center of the photocathode.

In a high definition phototube scanner system the amplitudes of the output pulses obtained from scanning a plurality of lines on a chart has been found to barely exceed the random noise voltage produced by the phototube. Because of the change in sensitivity of the photocathode during the scanning interval, it is difficult to separate the small signal pulses from the random noise pulses produced by the phototube. Since the amplitudes of the random noise pulses vary according to the sensitivity of the photocathode, any attempt at separating the desired pulses from the random noise pulses by clipping results in a loss of the desired pulses which occur near the extremes of the scanning interval. Where it is desired to obtain a series of pulses of uniform amplitude when a phototube scanner transversely scans a series of uniformly illuminated lines on a chart, some means must be provided to compensate for the changes in the sensitivity of the phototube scanner.

Accordingly, the principal object of the present invention is to provide a phototube scanning system for producing a series of equi-amplitude output pulses while scanning a series of uniformly illuminated lines on a chart.

Another object of the invention is to vary the gain of a controllable transmission circuit coupled to the output of a phototube scanner inversely with respect to the sensitivity of the phototube scanner during the scanning interval.

In accordance with the present invention there is introduced an improved system for equalizing the amplitudes of a series of pulses obtained from a phototube scanner whose sensitivity varies during the scanning interval. The output pulse signals from the phototube corresponding to the lines being scanned are amplified and supplied to a low-pass filter to obtain an output control voltage whose waveform varies according to the changes in sensitivity of the phototube scanner. The amplified pulse signals from the phototube are differentiated to remove the component of the output voltage at the scanning frequency, and the differentiated pulses are supplied to an equalizing amplifier. The output control voltage from the low-pass filter is amplified and inverted, and is supplied to the equalizing amplifier to vary its gain inversely according to the sensitivity of the phototube scanner. The peak-to-peak amplitude of the output pulses from the equalizing amplifier is substantially constant throughout the scanning cycle and independent of changes in the sensitivity of the phototube scanner. The output pulses from the equalizing amplifier are differentiated and supplied to a pulse generator to produce noise free output pulses of constant amplitude.

Figure 2:
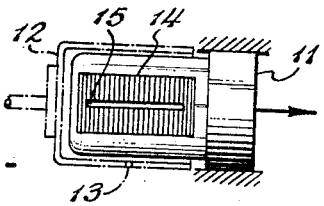
Figure 3:
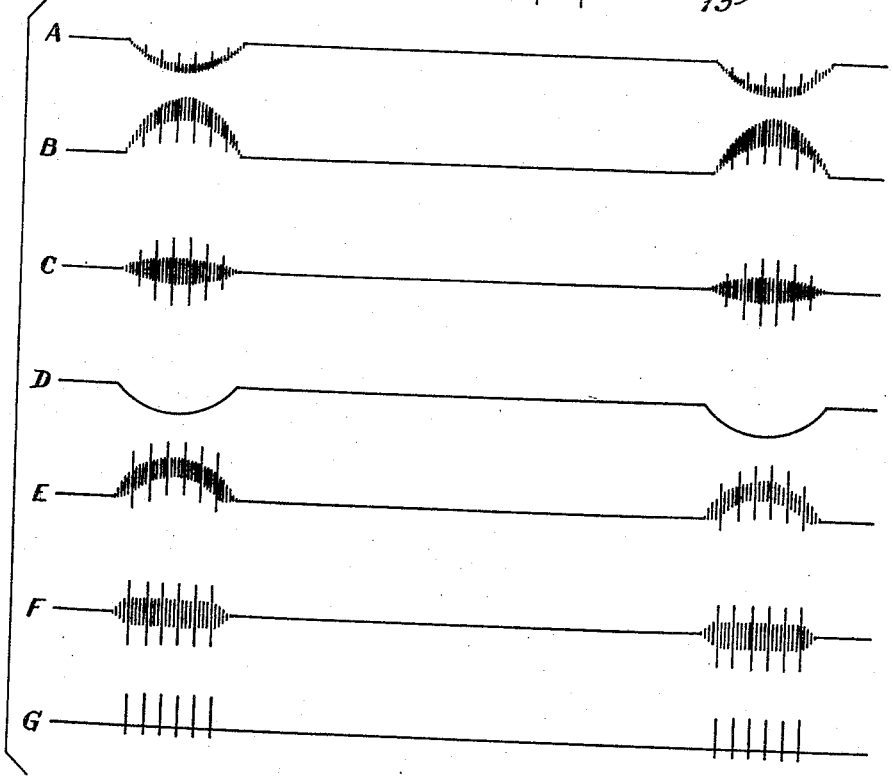

The above objects of and the brief introduction to the present invention will be more fully understood and further objects and advantages will become apparent from a study of the following detailed description in connection with the drawings, wherein, Fig. 1 is a block diagram of the phototube pulse amplitude equalizing system of the present invention, Fig. 2 is a sectional view of the scanner showing the phototube with an apertured mask covering the opening to the photosensitive cathode, and Fig. 3 illustrates the waveforms of voltages associated with the block diagram of Fig. 1.

Referring to Fig. 1, a phototube 11 situated within a hollow cylindrical drum 12 is responsive to an image projected upon its photocathode. A narrow diagonal slit 13 in the wall of the drum admits light to the photocathode. A mask 14 having a long narrow aperture 15 extending parallel to the longitudinal axis of the phototube is placed over the opening to the photocathode, as shown in Fig. 2, to admit only the light which passes through the aperture. The cylindrical drum 12 is rotated at a constant angular velocity by motor 16 to allow a scanning light beam to be projected over the surface of the photocathode through the aperture 15. The phototube scanner transversely scans a plurality of uniformly illuminated lines 17 on a chart 18. The image of the lines being scanned is focused upon the cathode by means of lens 19.

The phototube 11 produces an output signal illustrated as waveform A in Fig. 3. The signal consists of a series of short positive pulses corresponding to the dark lines 17 which are being transversely scanned and a further component of signal at the scanning frequency caused by the illuminated areas of chart 18. In addition to these two components, the output signal from the phototube includes random noise pulses produced by shot effect within the phototube. Where the widths of the narrow slits 13 and 15 are very small to provide a high definition photo scanner, only a small beam of light is projected through the scanner upon the photocathode. Under these conditions, the amplitudes of the random noise pulses caused by shot effect may be almost as large as the short positive signal pulses.

The amplitude of the short positive pulses of waveform A as well as the amplitude of the random noise pulses and the output signal at the scanning frequency varies during the scanning interval as illustrated in Fig. 3. This variation in amplitude is caused by a change in the sensitivity of the phototube to the scanned image extending over the surface of its photocathode, the amplitude of the signal varying according to the sensitivity of the phototube. While waveform A shows that the sensitivity of the phototube is greatest at the center of scan, which corresponds generally to the center of the photocathode, it has been found that different phototubes possess different sensitivity characteristics, some exhibiting higher sensitivity nearer one end of the photocathode than the other. Because of the non-uniformity in the sensitivity characteristics of phototubes, and in view of the small signal-tonoise ratio of the phototube output voltage in a high definition scanner, it is difficult to utilize the short positive pulses produced by the phototube scanner system. In applications where it is desired that the phototube scanner produce a series of output pulses of substantially constant amplitude and relatively free of noise, a system for compensating for the variation in sensitivity of the phototube during the scanning interval is required.

A block diagram of a suitable sensitivity compensating system is illustrated in Fig. 1. The output signal from the phototube 11 of waveform A is applied to the input of a video or pulse amplifier 20. The amplified output signal appears as waveform B in Fig. 3. This output signal is further amplified in the automatic gain control amplifier 21 and supplied to an automatic gain control rectifier 22. An automatic gain control voltage produced by the AGC rectifier 22 is applied to control the gain of video amplifier 20 to stabilize the peak level of the output signal of waveform B.

The output signal of waveform B is further applied to the input of a low-pass filter 23 which removes the short positive pulses and the random noise pulses from the output signal at the scanning frequency. The resulting output signal from the low-pass filter is the component of the phototube output signal which varies according to the illuminated area on chart 18 at the scanning frequency. Since the magnitude of this component of phototube output signal varies according to the sensitivity of the phototube, this signal may be employed to compensate for the changes in the sensitivity. This output signal is amplified and inverted in amplifier 24 and coupled to a D. C. restorer 25. The compensating voltage from the D. C. restorer 25, illustrated as waveform D, is applied to control the gain of an equalizing amplifier 26.

The amplified phototube output signal of waveform B is applied to a differentiating circuit or high-pass filter 27 for removing the scanning frequency component of waveform B from the short pulse signals. The output voltage from the differentiating circuit 27 appears as waveform C in Fig. 3, and this voltage is applied to the input of equalizing amplifier 26. The polarity of the compensating voltage of waveform D is such as to reduce the amplification in the equalizing amplifier 26 inversely as the sensitivity of the phototube 11. Accordingly, the differentiated short pulses appearing near the extremes of the scanning interval are amplified more than the differentiated short pulses occurring near the center of the scanning interval. As a result, equalizing amplifier 26 produces a series of amplified output pulses having the same or substantially the same peak-to-peak amplitude as illustrated in waveform E. The output voltage of waveform E also includes the scanning frequency component caused by the introduction of the compensating voltage of waveform D into equalizing amplifier 26. Moreover, it is seen that the peak-to-peak value of the random noise pulses at the output of the equalizing amplifier are substantially constant.

To remove the scanning frequency component of waveform E, the output voltage from equalizing amplifier 26 is applied to the differentiating circuit or high-pass filter 28. The output signal from the differentiating circuit 28 appears as waveform F, and the peak-to-peak amplitudes of the series of pulses as well as the peak-to-peak values of the random noise pulses are substantially constant. These pulses may be used directly if desired or may be applied to a pulse generator or blocking oscillator 29 which produces a pulse corresponding to each of the pulses of waveform F. The output pulses from the blocking oscillator 29, illustrated by waveform G, correspond to the lines 17 being scanned by the phototube scanner, and these positive pulses may be supplied to a suitable utilization device.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a phototube scanner system for transversely scanning a plurality of uniformly illuminated lines on a chart wherein the sensitivity of said phototube scanner system varies during the scanning interval, an amplitude equalizing system for correcting the variation in phototube sensitivity comprising in combination, means including a low-pass filter means coupled to the output of said phototube scanner system for receiving the signal output voltage therefrom, said signal output voltage including a low-frequency component varying according to the sensitivity of said phototube scanner and including a plurality of short pulses corresponding to the lines on said chart being scanned, said low-pass filter producing an output control voltage varying according to the sensitivity of said phototube scanner, controllable amplification means coupled to the output of said phototube scanner for receiving said output voltage, means coupling said output control voltage from said low-pass filter means to said controllable amplification means for varying the amplification therethrough inversely according to the magnitude of said output control voltage, said controllable amplification means producing output pulses corresponding to the lines on said chart whose amplitude is substantially independent of changes in sensitivity of said phototube scanner system, and pulse generator means coupled to the output of said controllable amplification means for producing output pulses of constant amplitude corresponding to the lines on said chart.

2. The phototube scanner system as defined in claim 1 wherein said controllable amplification means coupled to said phototube scanner for receiving the output signal voltage therefrom includes a differentiating circuit means for differentiating said plurality of short pulses.

3. A system for compensating for the variation in sensitivity of a phototube scanner during the scanning interval comprising in combination, a phototube responsive to a scanning image extending over the surface of its photocathode, said phototube producing an output signal whose magnitude varies during the scanning interval according to the sensitivity of the photocathode over its surface area, means coupled to the output of said phototube and responsive to said output signals for producing a control voltage varying inversely according to the sensitivity of said phototube, a controllable amplifier coupled to the output of said phototube for receiving said output signals, and means coupling said control voltage to said controllable amplifier for varying the gain therein inversely according to the sensitivity of said phototube, said controllable amplifier producing an output signal whose magnitude is substantially independent of changes in the sensitivity of said phototube.

4. The system for compensating for the variations in sensitivity of a phototube scanner as defined in claim 3 wherein said means coupled to the output of said phototube and responsive to said output signal for producing said control voltage includes a low-pass filter means.

5. A system for compensating for the variations in the amplitude of the output signal from a phototube scanner due to variations in the sensitivity of the phototube during the scanning interval comprising in combination, a phototube responsive to a scanning image extending over the surface of its photocathode, said phototube producing an output signal varying in amplitude during the scanning interval, means coupled to the output of said phototube and responsive to said output signal for producing a control voltage varying inversely according to the amplitude of said output signal, a controllable amplification means coupled to the output of said phototube, and means coupling said control voltage to said controllable amplification means for varying the transmission therethrough inversely according to the amplitude of said phototube output signal, said controllable amplification means producing an output voltage substantially independent of variations in the amplitude of said output signal from said phototube.

6. Apparatus for separating desired pulse components from undesired random noise components of a composite electrical signal wherein the amplitudes of the desired and undesired components vary in like manner, the maximum amplitude of the undesired components approximating or exceeding the minimum amplitude of the desired components, said composite electrical signal including a further component that varies in magnitude in a manner that corresponds substantially to the variations in amplitude of said desired and undesired components, said apparatus comprising a controllable amplification means including signal input and signal output terminals and a control signal terminal and having the characteristic of responding jointly to input signals applied to said input terminal and a control signal applied to said control signal terminal to produce output signals that are like said input signals but vary in amplitude with respect thereto in accordance with the variations in the amplitude of said control signal; means for applying said desired pulse components and said undesired noise components of said composite signal to said signal input terminal of said controllable amplification means; and means for applying said further component of said composite signal to said control signal terminal of said controllable amplification means.

7. Apparatus for separating desired pulse components from undesired random noise components of a composite electrical signal wherein the amplitudes of the desired and undesired components vary in like manner, the maximum amplitude of the undesired components approximating or exceeding the minimum amplitude of the desired components, said composite electrical signal including a further component that varies in magnitude in a manner that corresponds substantially to the variations in amplitude of said desired and undesired components, said apparatus comprising a controllable amplification means including signal input and signal output terminals and a control signal terminal and having the characteristic of responding jointly to input signals applied to said input terminal and a control signal applied to said control signal terminal to produce output signals that are like said input signals but vary in amplitude with respect thereto in accordance with the variations in the amplitude of said control signal; signal component separating means for receiving said composite signal at a signal input terminal and for separating from said composite signal and delivering at a signal output terminal said further component; means for applying said composite signal to said signal input terminal of said controllable amplification means, and means for applying the output signal of said signal component separating means to said control signal terminal of said controllable amplification means.

8. Apparatus for separating desired pulse components from undesired random noise components of a composite electrical signal wherein the amplitudes of the desired and undesired components vary in like manner, the maximum amplitude of the undesired components approximating or exceeding the minimum amplitude of the desired components, said composite electrical signal including a further component that varies in magnitude in a manner that corresponds substantially to the variations in amplitude of said desired and undesired components, said apparatus comprising a controllable amplification means including signal input and signal output terminals and a control signal terminal and having the characteristic of responding jointly to input signals applied to said input terminal and a control signal applied to said control signal terminal to produce output signals that are like said input signals but vary in amplitude with respect thereto in accordance with the variations in the amplitude of said control signal; first signal component separating means for receiving said composite signal at a signal input terminal and for separating from said composite signal and delivering as a combined signal at a signal output terminal said desired pulse components and said random noise components; means for coupling the output signal of said first signal component separating means to the signal input terminal of said controllable amplification means; second signal component separating means for receiving said composite signal at a signal input terminal and for separating from said composite signal and delivering at a signal output terminal said further component, and means for coupling the output signal of said second signal component separating means.

9. A system for receiving a composite signal including at least a first signal and a second signal varying in magnitude in accordance with the instantaneous magnitude of said first signal, a controllable amplification means for receiving an input signal and a control signal and for varying the amplification of said input signal in accordance with the magnitude of said control signal, separating means for receiving said composite signal and for separating said first signal from said composite signal, means for coupling the first signal separated by said separating means as said control signal to said controllable amplification means, and means for coupling said composite signal as said input signal to said controllable amplification means.

10. A system for receiving a composite signal including at least a first signal and a second signal varying in magnitude in accordance with the instantaneous magnitude of said first signal, a controllable amplification means for receiving an input signal and a control signal and for varying the amplification of said input signal in accordance with the magnitude of said control signal, first separating means for receiving said composite signal and for separating said first signal from said composite signal, means for coupling the first signal separated by said first separating means as said control signal to said controllable amplification means, second separating means for receiving said composite signal and for separating said second signal from said composite signal, and means for coupling said second signal separated by said second separating means as said input signal to said controllable amplification means.

References Cited in the file of this patent

UNITED STATES PATENTS

| | | |
|---|---|---|
| 2,507,743 | Victoreen | May 16, 1950 |
| 2,526,509 | Shawhan | Oct. 17, 1950 |
| 2,659,823 | Vossberg | Nov. 17, 1953 |
| 2,783,389 | Cummings et al. | Feb. 26, 1957 |

UNITED STATES PATENT OFFICE
CERTIFICATE OF CORRECTION

Patent No. 2,871,369

January 27, 1959

Roger B. Williams, Jr.

It is hereby certified that error appears in the printed specification of the above numbered patent requiring correction and that the said Letters Patent should read as corrected below.

Column 6, line 25, after "means" and before the period, insert -- to the control signal terminal of said controllable amplification means --.

Signed and sealed this 29th day of March 1960.

(SEAL)
Attest:

KARL H. AXLINE
Attesting Officer

ROBERT C. WATSON
Commissioner of Patents